(12) United States Patent
Thorn

(10) Patent No.: US 11,277,972 B2
(45) Date of Patent: Mar. 22, 2022

(54) PRUNING DEVICE WITH REMOVABLE SAW BLADE

(71) Applicant: OAKTHRIFT CORPORATION LTD, Hertfordshire (GB)

(72) Inventor: James John Thorn, Rochford (GB)

(73) Assignee: OAKTHRIFT CORPORATION LTD., Hertfordshire (GB)

(*) Notice: Subject to any disclaimer, the term of this patent is extended or adjusted under 35 U.S.C. 154(b) by 206 days.

(21) Appl. No.: 15/955,326

(22) Filed: Apr. 17, 2018

(65) Prior Publication Data

US 2018/0310486 A1 Nov. 1, 2018

(30) Foreign Application Priority Data

Apr. 27, 2017 (GB) ...................................... 1706675

(51) Int. Cl.
*A01G 3/08* (2006.01)
*A01G 3/025* (2006.01)
*A01G 3/02* (2006.01)

(52) U.S. Cl.
CPC ............... *A01G 3/083* (2013.01); *A01G 3/02* (2013.01); *A01G 3/0251* (2013.01)

(58) Field of Classification Search
CPC .......... A01G 3/08; A01G 3/083; A01G 3/025; A01G 3/0251; A01G 3/0255; A01G 3/081; B26B 29/04; B26B 13/12; B26B 13/16; B26B 13/22; B26B 29/00; B26B 29/02; B26B 29/025; B27B 21/04; B23D 51/03; B23Q 13/00

USPC .............. 30/144, 153, 164; 7/128, 167, 168; D8/95, 97
See application file for complete search history.

(56) References Cited

U.S. PATENT DOCUMENTS

| | | | | | |
|---|---|---|---|---|---|
| 144,177 | A | * | 10/1873 | Williams | B26B 29/04 30/233 |
| 192,660 | A | * | 7/1877 | Schwatka | B24D 15/084 30/138 |
| 216,605 | A | * | 6/1879 | Crosby | B26B 29/00 224/234 |
| 292,369 | A | * | 1/1884 | Schlüchtner | B23Q 13/00 150/161 |
| 753,048 | A | * | 2/1904 | De Moineaux | B26B 29/04 30/233 |
| 1,426,214 | A | * | 8/1922 | Rausse | A01G 3/02 30/262 |
| 1,549,545 | A | * | 8/1925 | Hickman | B26B 1/04 30/153 |
| 1,783,853 | A | * | 12/1930 | Miriello | B26B 13/04 30/260 |

(Continued)

*Primary Examiner* — Ghassem Alie
*Assistant Examiner* — Samuel A Davies
(74) *Attorney, Agent, or Firm* — Weiss & Moy, P.C.; Jeffrey D. Moy

(57) ABSTRACT

A pruning device comprises a pair of cooperating blades that are pivoted together and handle parts movable to and from each other for a user to operate the cooperating blades. A saw blade part is attachable to and detachable from the device by a user. When the saw blade part is attached to the device the handle parts and cooperating blades are retained in a substantially fixed position relative to each other. When the saw blade part is detached from the device the handle parts and cooperating blades are movable relative to each other.

4 Claims, 13 Drawing Sheets

(56) References Cited

U.S. PATENT DOCUMENTS

| | | | | |
|---|---|---|---|---|
| 2,826,294 | A * | 3/1958 | Nicodemus | B23Q 13/00 30/153 |
| 3,055,108 | A * | 9/1962 | March | A01G 3/0475 30/257 |
| 3,422,532 | A * | 1/1969 | Ballard | A01G 3/0475 30/252 |
| 3,837,024 | A * | 9/1974 | Saunders | B23D 49/14 7/144 |
| 3,906,561 | A * | 9/1975 | Bawa | H02G 1/1217 7/107 |
| 3,906,630 | A * | 9/1975 | Megna | B26B 13/20 30/260 |
| 4,400,877 | A * | 8/1983 | Gingher, Jr. | B26B 13/06 30/151 |
| 4,461,081 | A * | 7/1984 | Gaskins | B26B 11/00 30/144 |
| 4,716,653 | A * | 1/1988 | Skyba | A01G 3/08 16/DIG. 25 |
| 4,720,030 | A * | 1/1988 | Petrovich | B26B 11/005 224/232 |
| 4,729,473 | A * | 3/1988 | Kulzer | B65D 73/0064 206/477 |
| 4,805,818 | A * | 2/1989 | Harrison | B26B 29/025 224/232 |
| 4,916,815 | A * | 4/1990 | Ohmura | B26B 29/04 30/151 |
| 5,060,381 | A * | 10/1991 | Taberlet | B26B 13/12 30/194 |
| 5,138,768 | A * | 8/1992 | Collins | B26B 3/06 224/232 |
| 5,255,436 | A * | 10/1993 | Yoshida | B26B 29/025 224/232 |
| 5,297,343 | A * | 3/1994 | Melter | B26B 29/04 30/143 |
| 5,363,957 | A * | 11/1994 | Reichner | A47F 5/0006 15/220.4 |
| 5,511,311 | A * | 4/1996 | Collins | B26B 1/08 224/232 |
| 5,595,295 | A * | 1/1997 | Lin | B65D 73/0071 206/349 |
| 5,794,345 | A * | 8/1998 | Ryon | B23D 51/03 30/144 |
| 5,988,027 | A * | 11/1999 | Lenox | A61B 17/8863 83/13 |
| 5,996,817 | A * | 12/1999 | Kao | A47F 5/0006 211/70.6 |
| 6,000,080 | A * | 12/1999 | Anderson | B25B 15/00 7/128 |
| 6,601,254 | B1 * | 8/2003 | Walz | B25B 13/461 7/128 |
| 6,854,184 | B2 * | 2/2005 | DiPalma | B26B 29/04 30/143 |
| 7,010,822 | B1 * | 3/2006 | Lin | B25F 1/006 7/143 |
| 7,650,992 | B1 * | 1/2010 | Huang | A45F 5/00 206/349 |
| 7,841,093 | B1 * | 11/2010 | Brady | B67B 7/44 30/408 |
| RE42,507 | E * | 6/2011 | Wilkinson | A61B 17/3215 606/167 |
| 8,127,454 | B1 * | 3/2012 | Gao | A61B 17/8863 30/92 |
| 9,643,266 | B1 * | 5/2017 | Hooyman | A01G 3/083 |
| 10,945,381 | B1 * | 3/2021 | Pringnitz | B25G 3/20 |
| 2001/0025423 | A1 * | 10/2001 | Paquin | B27B 17/02 30/382 |
| 2002/0184713 | A1 * | 12/2002 | Dallas | A01B 1/022 7/116 |
| 2002/0189965 | A1 * | 12/2002 | Welsh, Jr. | B65D 85/54 206/521 |
| 2004/0250423 | A1 * | 12/2004 | Yu | B26B 5/002 30/123 |
| 2005/0246900 | A1 * | 11/2005 | Simpson | A01G 3/0251 30/153 |
| 2006/0117572 | A1 * | 6/2006 | Hsieh | B26B 29/04 30/250 |
| 2008/0235953 | A1 * | 10/2008 | Wang | B26B 5/002 30/151 |
| 2009/0172950 | A1 * | 7/2009 | Jenkinson | A01G 3/00 30/155 |
| 2013/0026054 | A1 * | 1/2013 | Adams | A45F 5/021 206/349 |
| 2017/0057108 | A1 * | 3/2017 | Albano | B43L 23/00 |
| 2018/0117753 | A1 * | 5/2018 | Bar | B26B 3/06 |
| 2020/0108518 | A1 * | 4/2020 | Fountain | B26B 29/04 |

* cited by examiner ised the present invention seeks to improve upon the prior art.

PRUNING DEVICE WITH REMOVABLE SAW BLADE

The present invention relates to improvements in hand tools. In particular the present invention relates to a saw blade that is attachable to a garden pruning device such as shears or loppers.

When attending to garden maintenance a range of tools is required, These may include secateurs, shears and loppers for cutting smaller diameter garden materials such as grass, twigs and small branches and one or more saws for cutting branches of greater diameters that are too thick for loppers to cut.

Carrying a range of tools may present its own problems, particularly in larger gardens.

The present invention seeks to improve upon the prior art.

According to the present invention there is provided a pruning device comprising:
 a pair of cooperating blades that are pivoted together;
 handle parts movable to and from each other for a user to operate the cooperating blades;
 a saw blade part that is attachable to and detachable from the device by a user;
wherein:
 when the saw blade part is attached to the device the handle parts and cooperating blades are retained in a substantially fixed position relative to each other.

By providing a pruning device as described when the saw blade part is detached from the device the handle parts and cooperating blades are movable relative to each other and the cooperating blades of the device may be employed for pruning.

When the saw part is attached the handles and cooperating blades are not movable relative to each other and a user may then saw with the device without movement of the handles inhibiting a sawing action. When the saw blade part is attached to the device the handles and cooperating blades may be said to be locked in a substantially fixed position relative to each other.

In some embodiments the saw blade part attaches to the cooperating blades.

In some embodiments when the saw blade is attached to the device the cooperating blades are retained in a closed position.

In some embodiments the saw blade part comprises a housing into which the cooperating blades are inserted when the saw blade part is attached to the device, and the housing prevents the handle parts and cooperating blades from moving relative to each other.

In some embodiments the saw blade part comprises an aperture through which a projection may be inserted to secure the saw blade part to the device.

In some embodiments an aperture is located in each of the cooperating blades and when the saw blade part is attached to the device a projection inserted through the apertures in the cooperating blades retains the handle parts in a substantially fixed position relative to each other.

In some embodiments the saw blade part comprises a projection.

In some embodiments the device comprises a dip to secure the saw blade part to the device.

In some embodiments the underside of at least one of the cooperating blades is configured to cooperate with a clip on the saw blade part.

In some embodiments the saw blade part comprises a folding saw blade movable between a first configuration wherein teeth of the saw blade are not exposed and a second configuration wherein teeth of the saw blade are exposed.

In some embodiments the pruning device is a pair of shears.

In some embodiments the pruning device is a pair of secateurs.

In some embodiments the pruning device is a pair of loppers.

In some embodiments only one of the handle parts of the pruning device is telescopically extendable in length.

In some embodiments both of the handle parts of the pruning device are each telescopically extendable in length.

In order that the present invention may be more fully understood a specific embodiment will now be described by way of example with reference to the accompanying drawings, of which:

Figure 1:
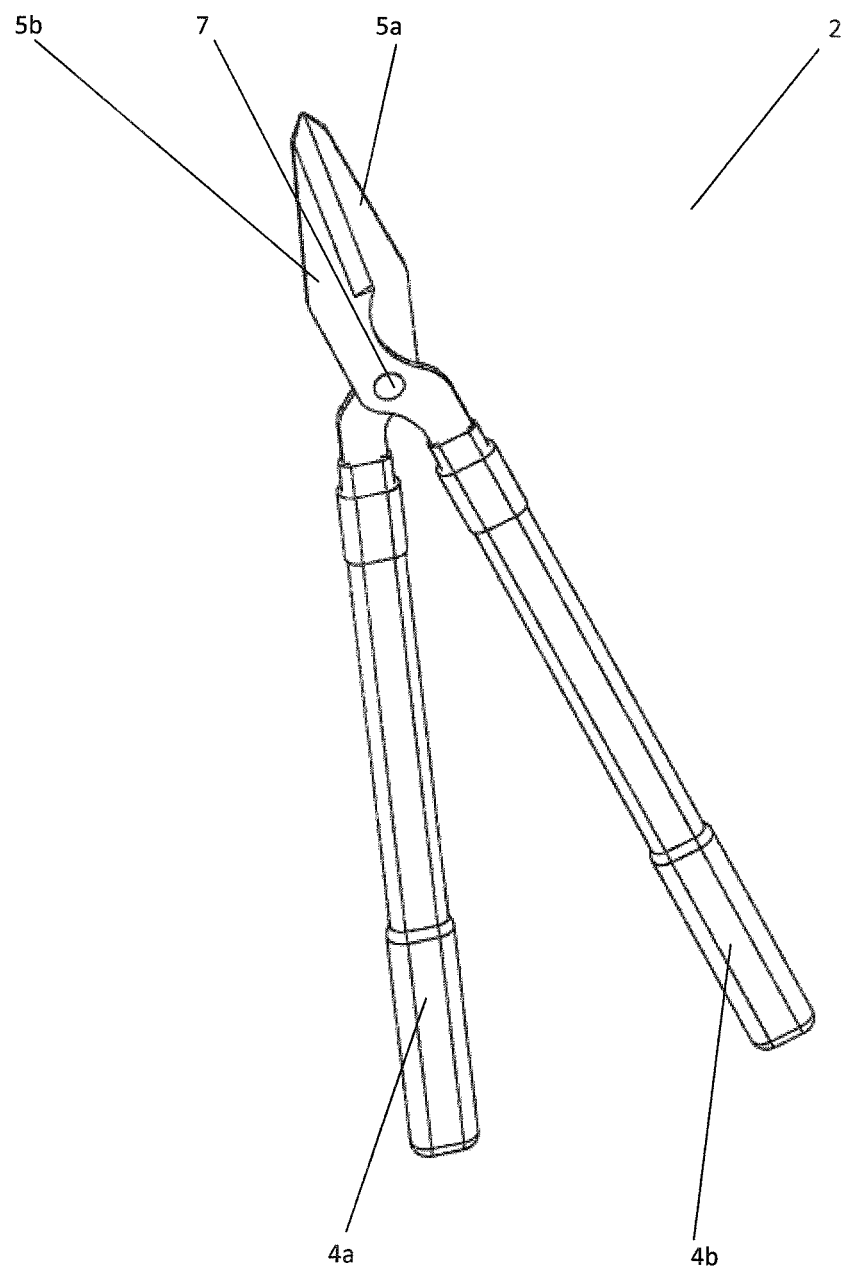
FIG. 1 is a perspective view of a first side pair of loppers in accordance with a first embodiment of the present invention.

Referring to the drawings, a pruning device 1 made in accordance with the present invention comprises a pair of loppers 2 and a saw attachment part 3.

Loppers 2 are of relatively standard construction, comprising two handles 4a, 4b, and two cooperating blades 5a, 5b, with each cooperating blade extending from a respective handle 4a, 4b. Handle and blade 4a, 5a is pivotally attached to handle and blade 4b, 5b by means of nut 6 and bolt 7 which passes through apertures (not shown) formed between handle parts 4a, 4b and blades 5a, 5b.

Saw blade attachment part 3 comprises a saw blade 8 having saw teeth for cutting, a housing 9 and aperture 10.

Saw blade attachment part 3 may be securely attached to loppers 2 as illustrated in FIGS. 5 to 8.

In this configuration cooperating blades 5a, 5b are snugly housed within housing 9, bolt 7 passes through aperture 10 and is secured therein by nut 6. In this configuration saw blade 8 extends beyond cooperating blades 5a, 5b.

Figure 2:
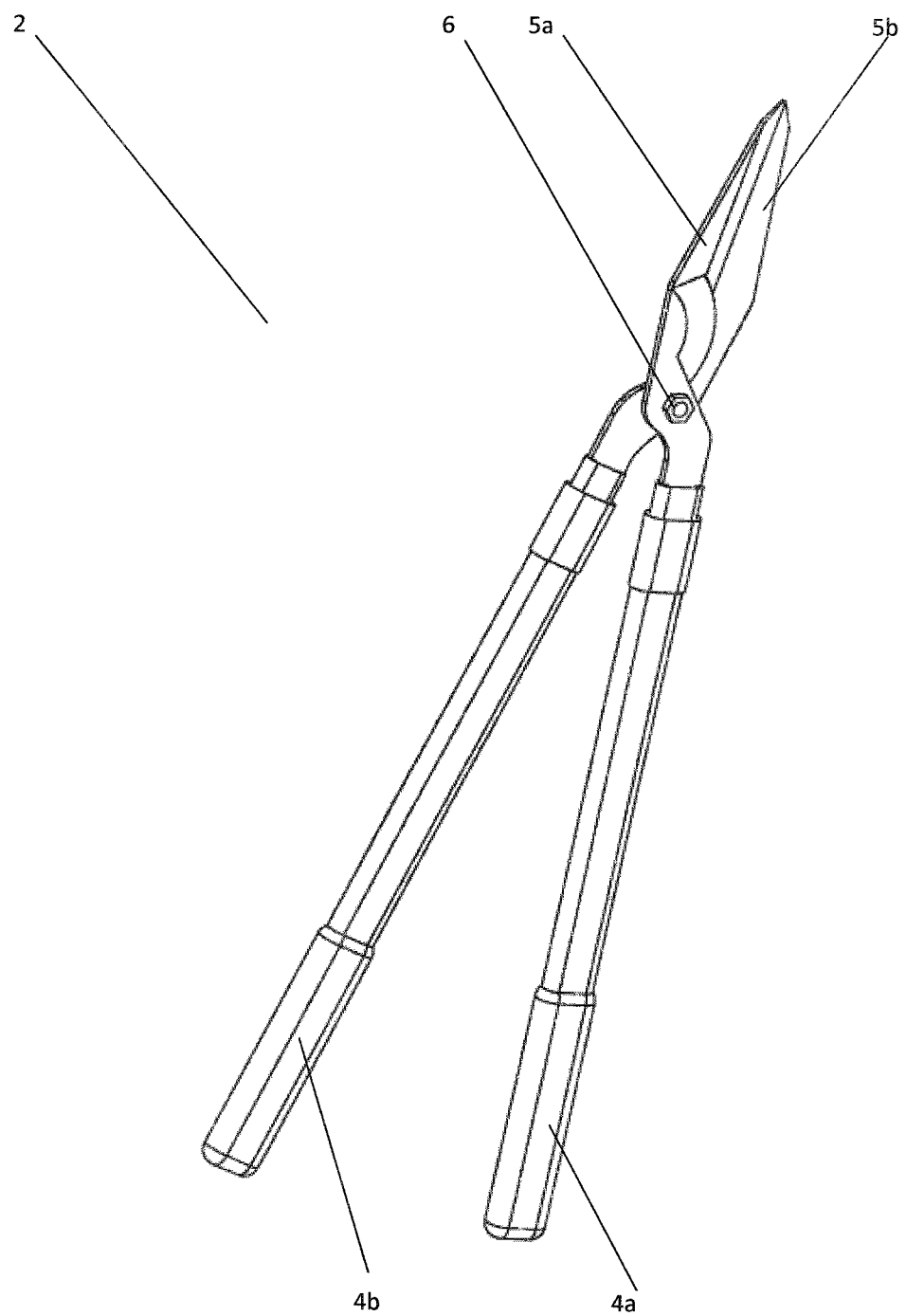
FIG. 2 is a perspective view of a second side of the loppers of FIG. 1.
Figure 3:
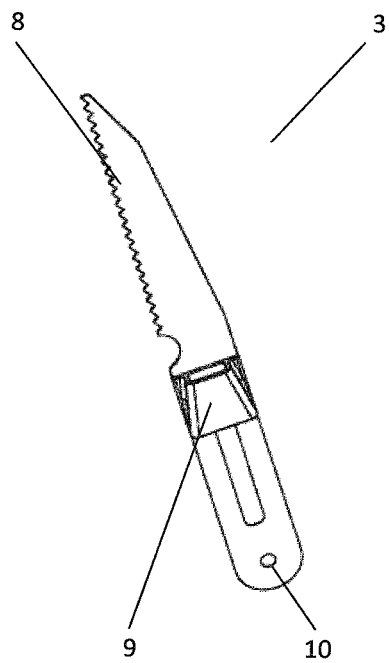
FIG. 3 is a perspective view of a first side of a saw attachment part for use with the loppers of FIGS. 1 and 2.
Figure 4:
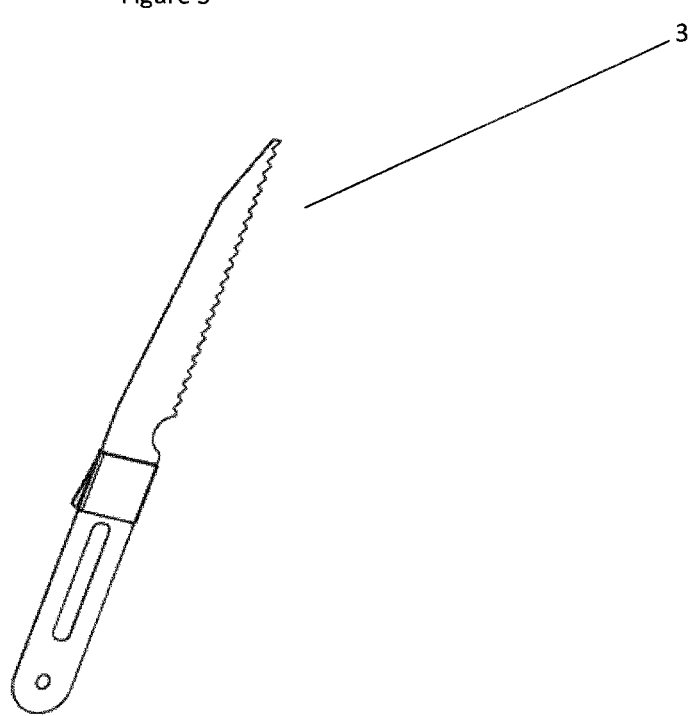
FIG. 4 is a perspective view of a second side of the saw attachment part of FIG. 3.
Figure 5:
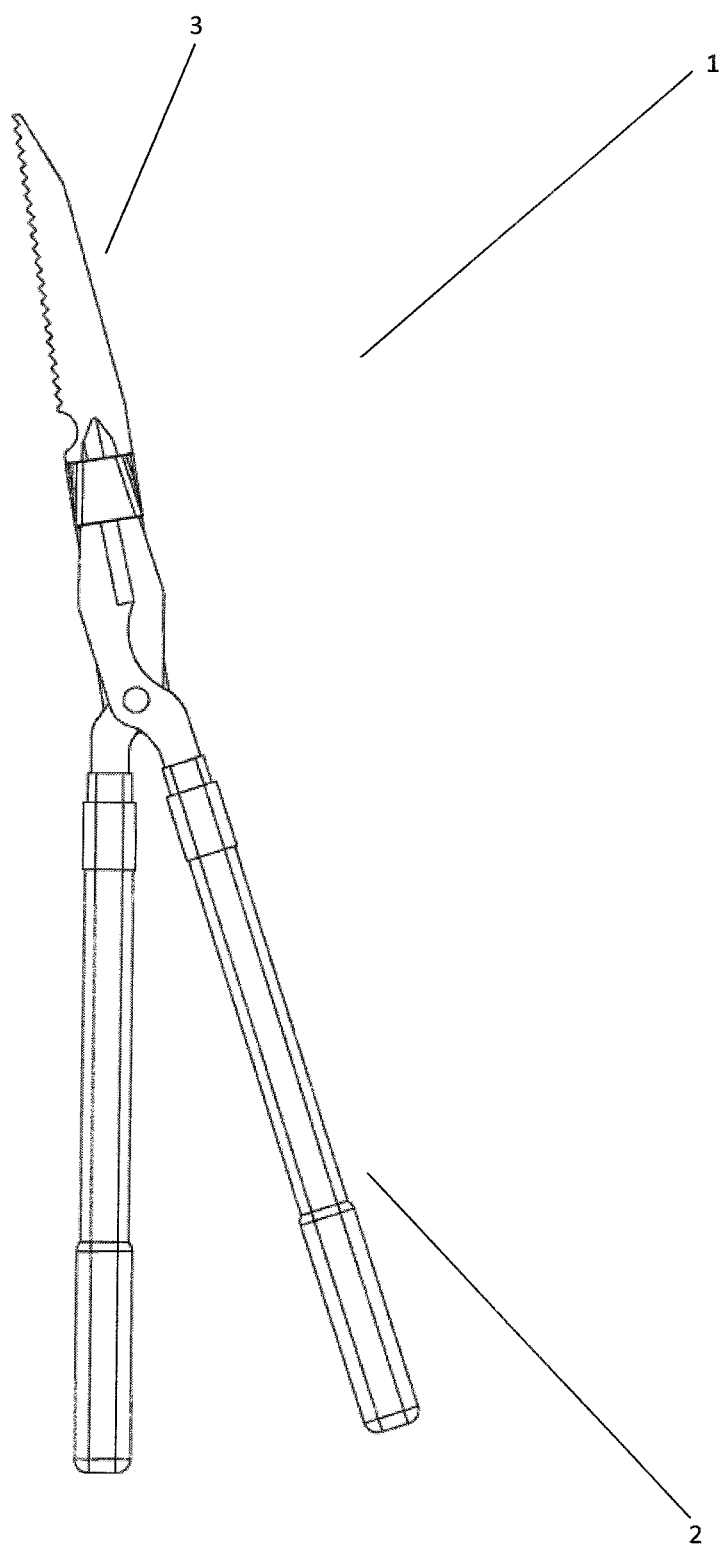
FIG. 5 is a perspective view of a first side of the loppers and saw attachment part when assembled.
Figure 6:
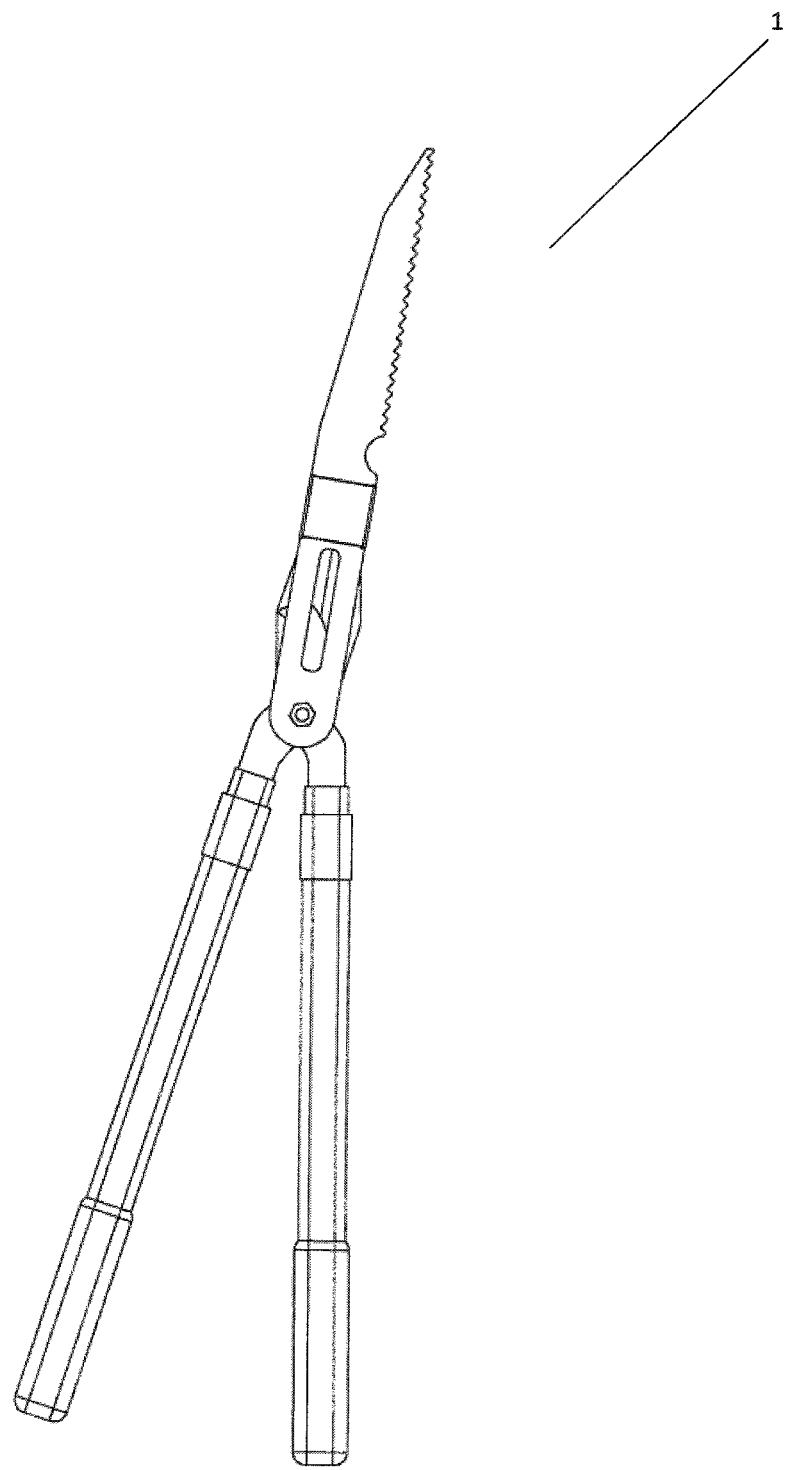
FIG. 6 is a perspective view of a second side of the loppers and saw attachment part when assembled.

When in the configuration shown in FIGS. 1 and 2 a user may employ loppers 2 as a regular set of loppers and prune vegetation accordingly.

When a user desires to employ saw blade 8 they may undo nut 6 so as to displace bolt 7, slide blades 5a, 5b into housing 9, locate bolt 7 through aperture 10 and the apertures (not shown) formed between handles 4a, 4b and blades 5a, 5b and reattach nut 6 to bolt 7.

Although in the present embodiment nut 6 is shown as a regular nut in other embodiments a wing nut may be used so as to aid a user in operation of pruning device 1.

Also in other embodiments a bolt may not need to be displaced. Instead saw blade attachment part 3 may flex such that aperture 10 is located over a bolt that extends from the loppers and a nut may then be attached to the bolt to secure saw blade attachment part 3 in position.

When in the configuration shown in FIGS. 5 to 8 a user may employ pruning device 1 as a saw, but is not able to use loppers 2 as housing 9 prevents blades 5a, 5b from moving relative to each other (and consequently prevents handles 4a, 4b from moving relative to each other) such that lopper 2 is inoperable by a user.

By preventing blades 5a, 5b and handles 4a, 4b from moving relative to each other the operation of pruning device 1 as a saw is enhanced. When sawing a user may hold device 1 with a single hand if so desired instead of holding both handles 4a 4b so as to prevent handles 4a, 4b from moving relative to each other.

Figure 7:
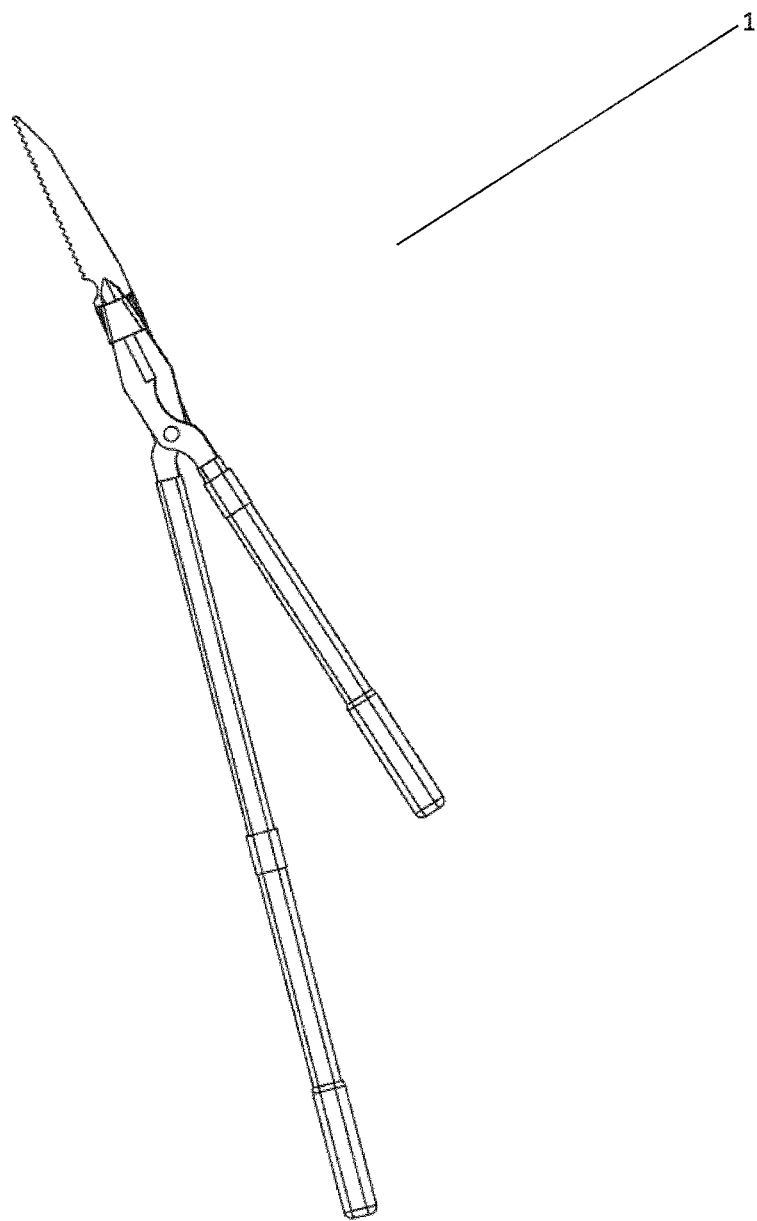
FIG. 7 is a perspective view of the first side of the loppers and saw attachment part when assembled with one handle extended.
Figure 8:
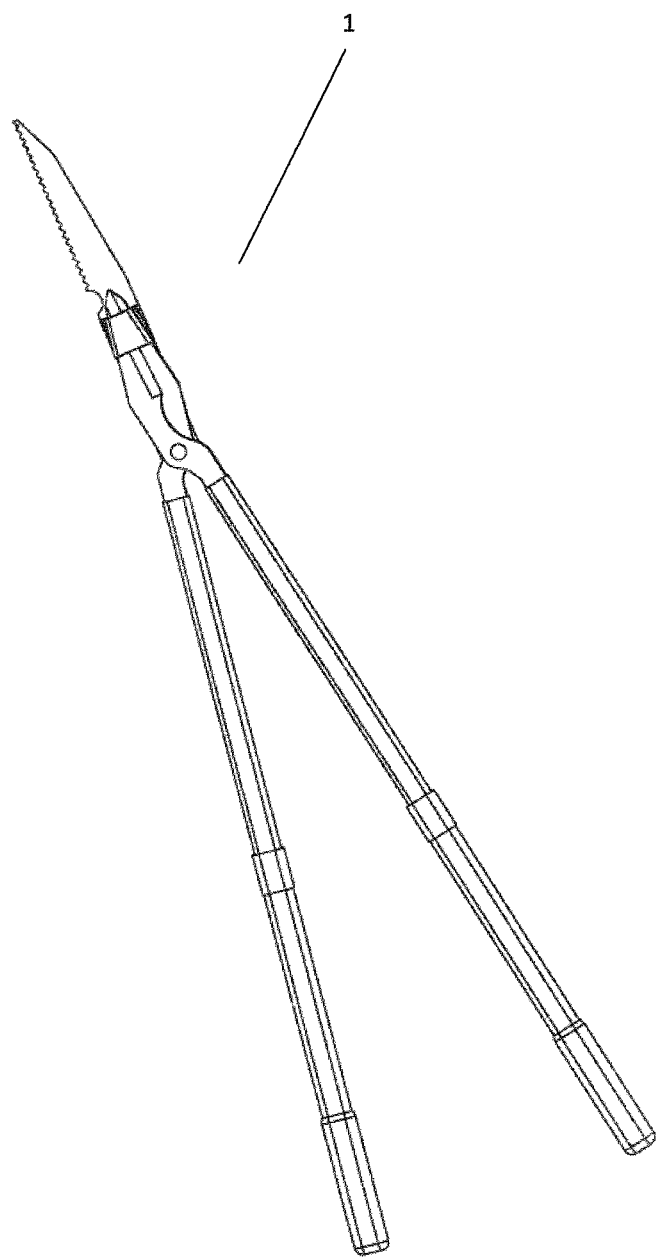
FIG. 8 is a perspective view of the first side of the loppers and saw attachment part when assembled with both handles extended.
Figure 9:
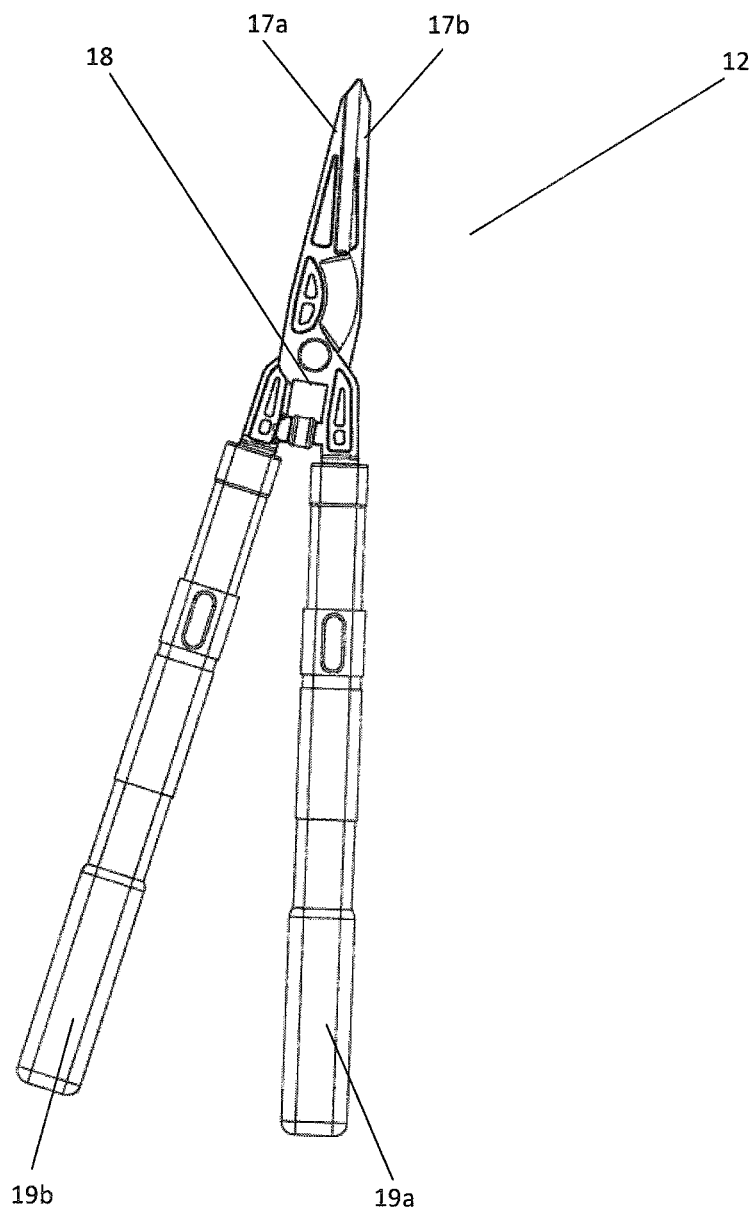
FIG. 9 is a perspective view of a pair of loppers in accordance with a second embodiment of the present invention.
Figure 10:
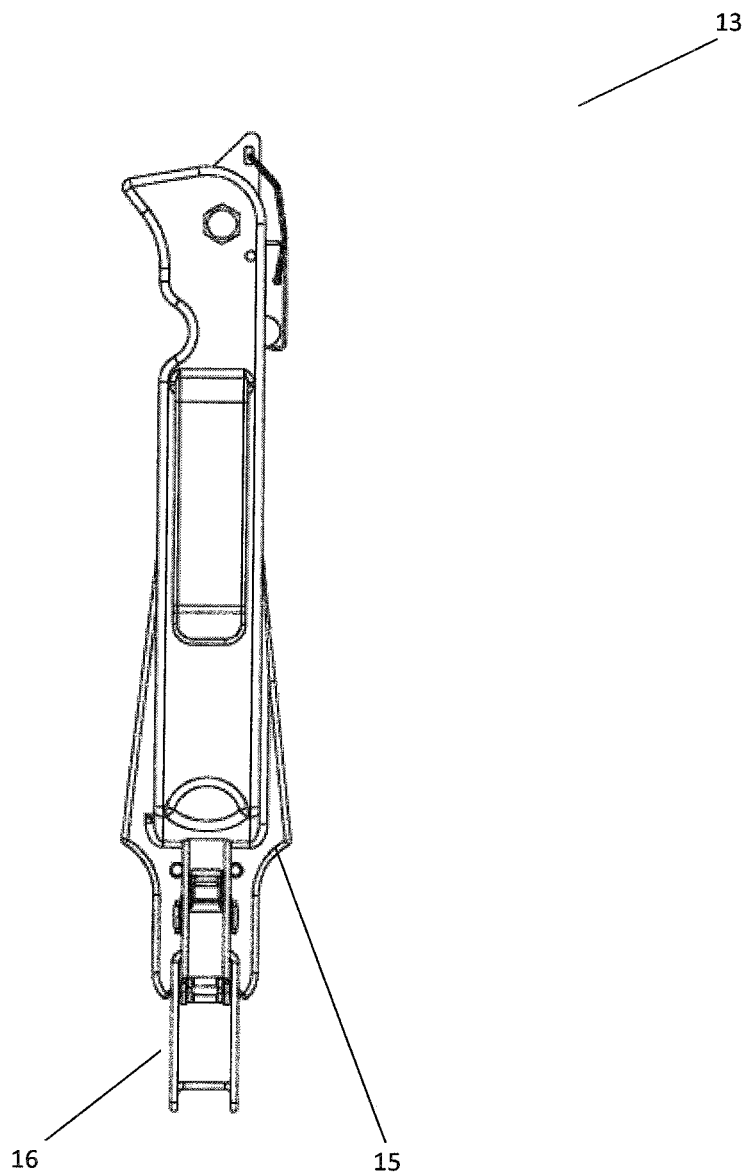
FIG. 10 is a first perspective view of a saw attachment part for use with the loppers of FIG. 9.
Figure 11:
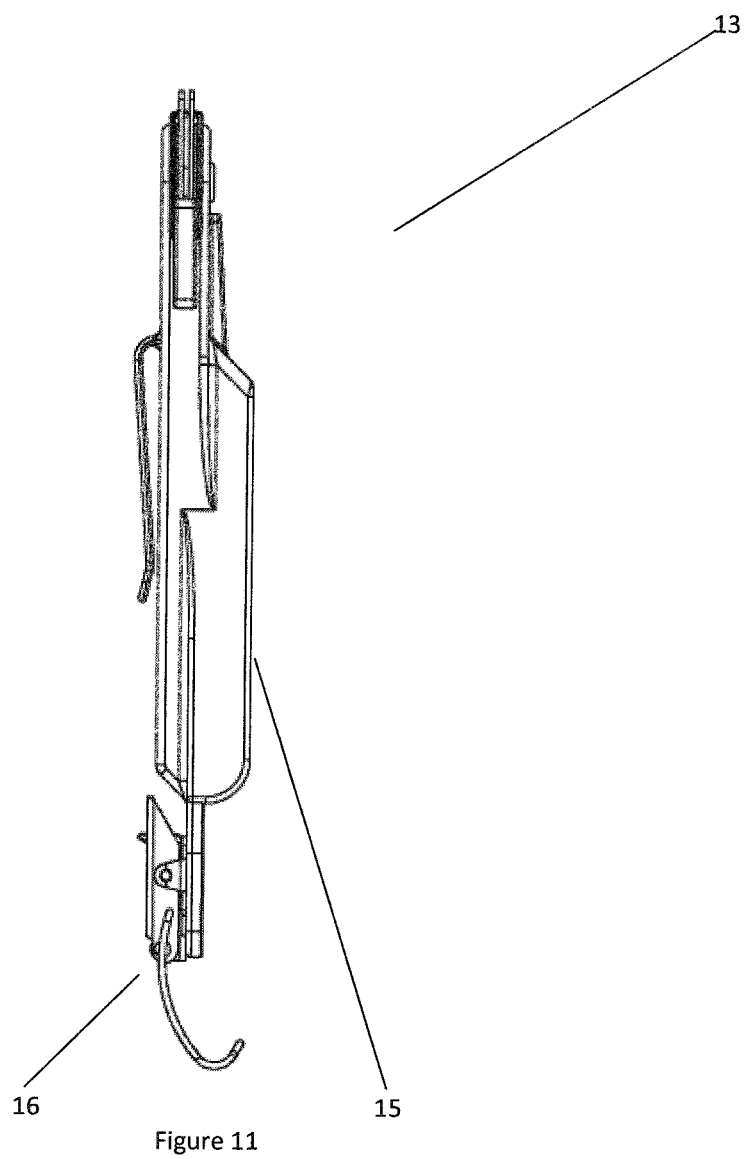
FIG. 11 is a view of a side of the saw attachment part of FIG. 10.

As illustrated in FIGS. 7 and 8 handles 4a, 4b are telescopically extendable in length as with many existing loppers.

In respect of the present invention it may be advantageous to extend only a single handle (4a or 4b depending upon user preference) when employing saw attachment part 3, as the weight of the unextended handle may assist the saw in operation by applying pressure to the material being cut.

Turning to a second embodiment of the present invention and FIGS. 9 to 13, a pruning device 11 made in accordance with the present invention comprises a pair of loppers 12 and a saw attachment part 13.

The fundamental principle of pruning device 11 is the same as that of pruning device 1, although saw attachment part 13 attached to loppers 12 in a slightly different manner.

Loppers 12 comprise handles 19a, 19b and blades 17a, 17b. Undersides 18 of blades 17a, 17b are linear.

Saw blade attachment part 13 comprises a saw blade 14, a housing 15 and a dip in the form of toggle latch 16 (also known as an over centre tension dip).

Saw blade 14 is rotatably attached to housing 15 such that it is foldable between a closed position where the teeth of saw blade 14 are not exposed and a usable extended position wherein the teeth of saw blade 8 are exposed.

Figure 12:
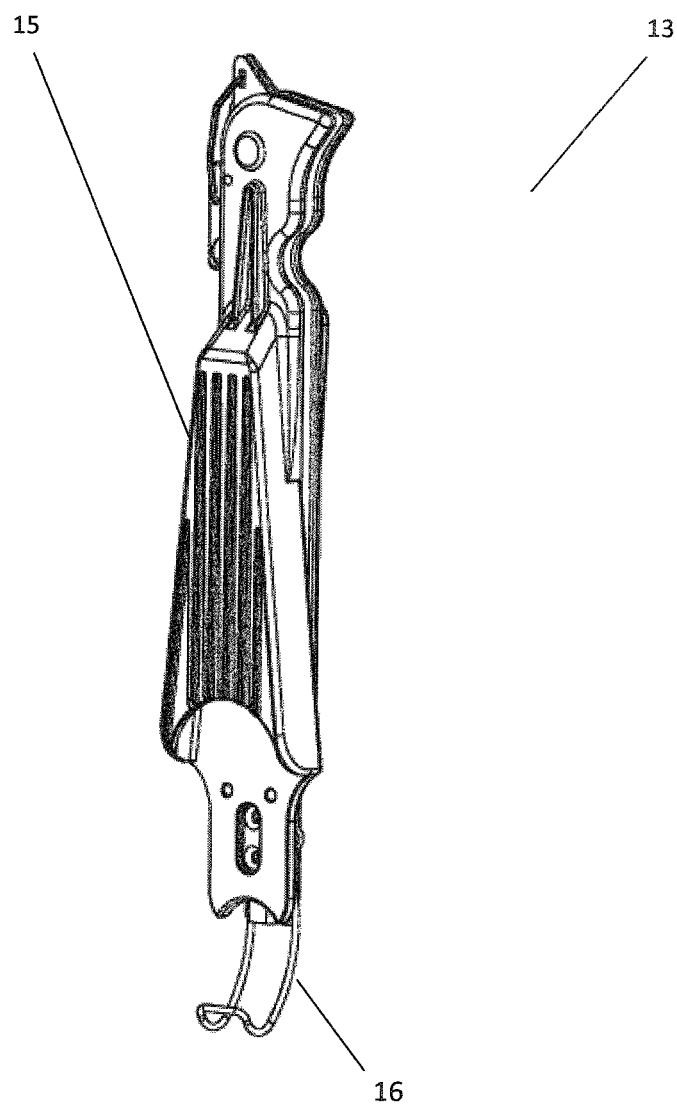
FIG. 12 is a second perspective view the saw attachment part of FIG. 10.
Figure 13:
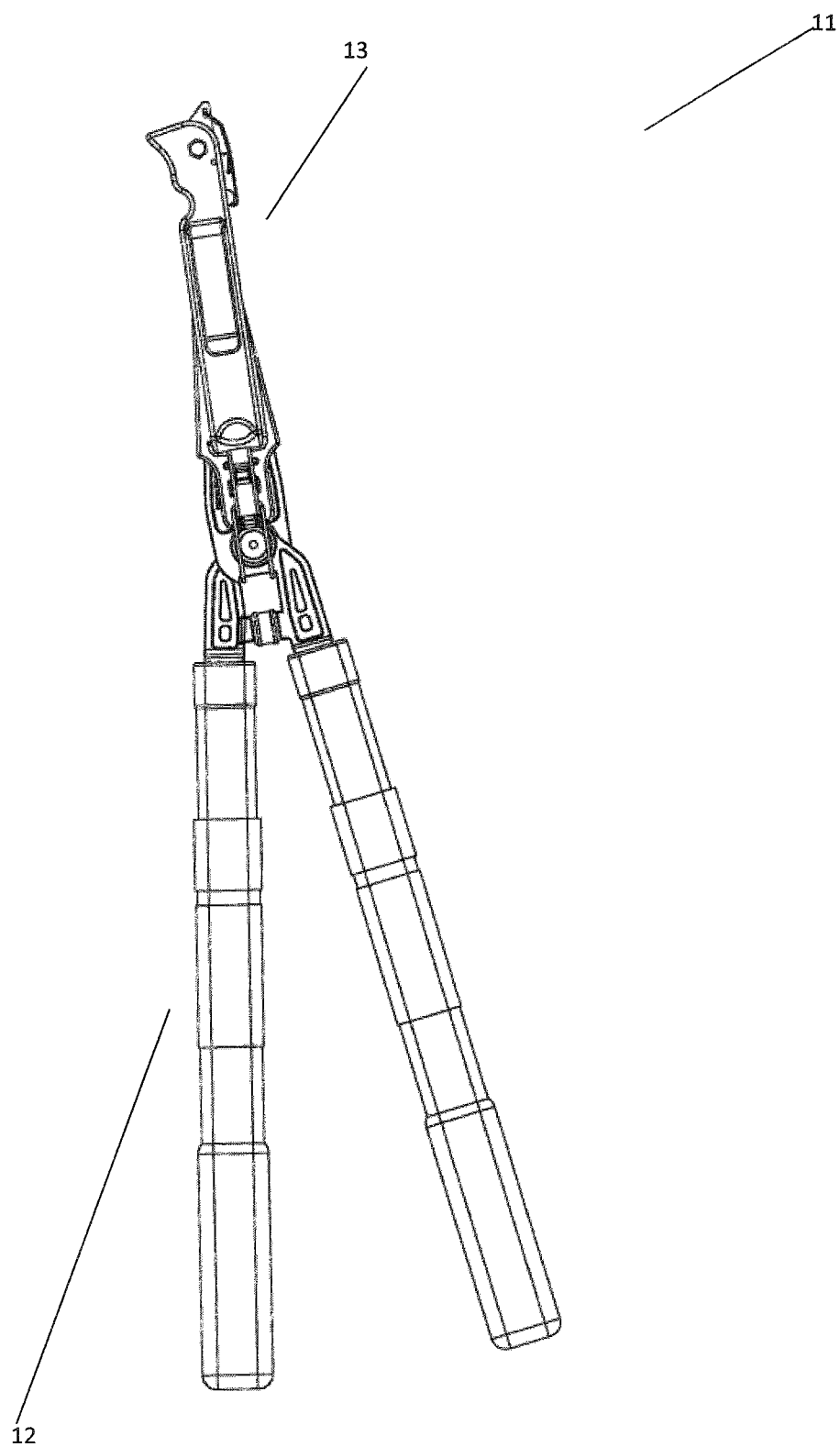
FIG. 13 is a perspective view of the loppers of FIG. 9 and saw attachment part of FIGS. 10 and 11 when assembled.
Figure 14:
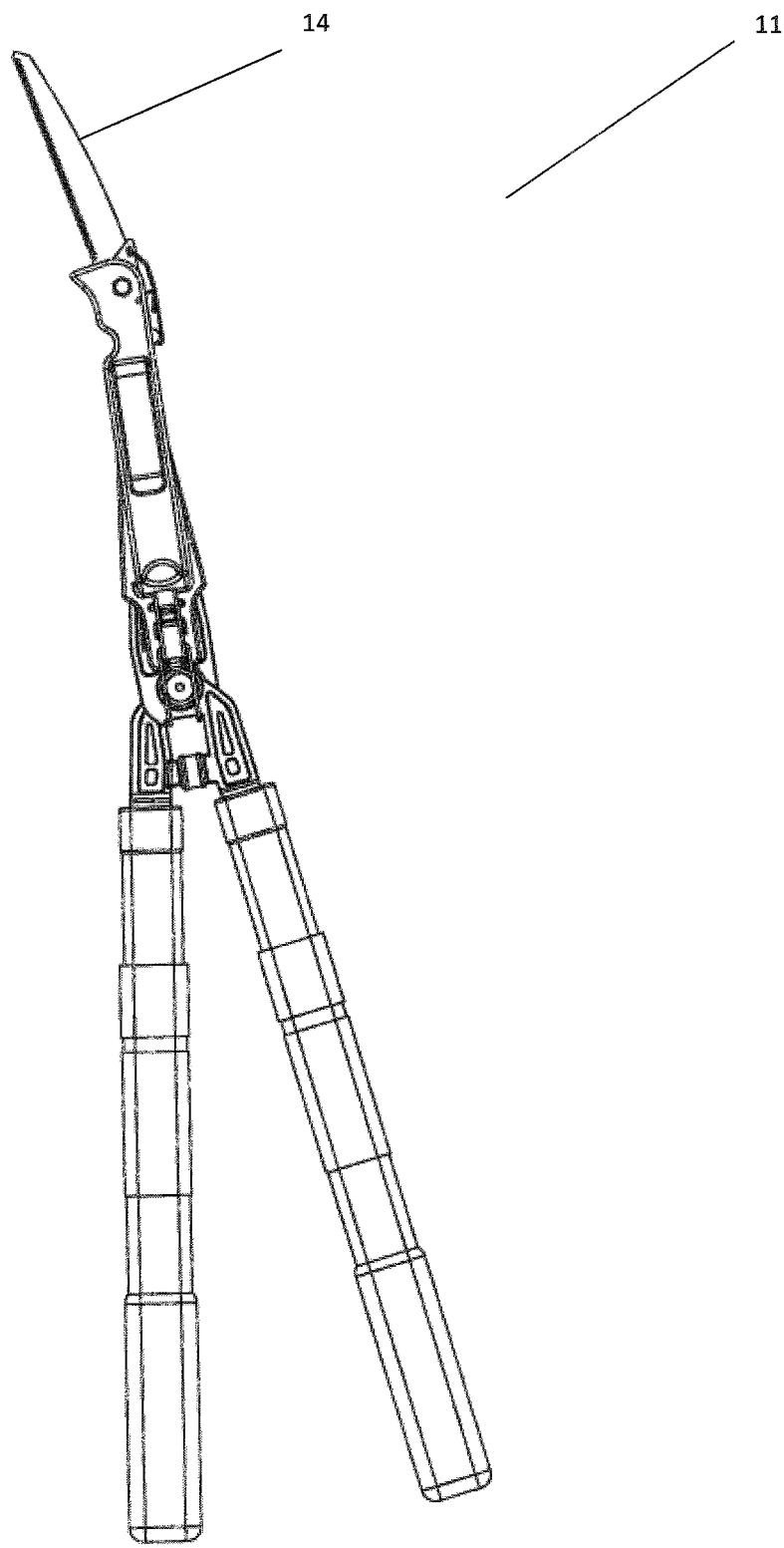
FIG. 14 is a perspective view of the tool of FIG. 12 with its saw extended.

Saw blade attachment part 13 may be securely attached to loppers 12 as illustrated in FIGS. 12 to 14.

When saw blade attachment part 13 is attached to loppers 12 the blades 17a, 17b of loppers 12 are housed within housing 15 such that they are held in a fixed position relative to each other.

Toggle latch 16 cooperates with the linear undersides 18 of blades 17a, 17b such that saw attachment part 13 is securely retained in position upon blades 17a, 17b.

It will be apparent that although in the present embodiment toggle latch 16 may cooperate with the linear undersides 18 of blades 17a, 17b in other embodiments a clip may cooperate with a differently shaped area or part of a set of loppers.

When saw attachment part 13 is attached to loppers 12 all of the benefits of pruning device 1 are realized in pruning device 11.

Furthermore, by preventing the blades and handles of lopper 12 from moving relative to each other when saw blade 14 is folded away in its closed position saw attachment part 13 acts as a safety device when loppers 12 are not in use.

It will be apparent that in other embodiments a variety of different manners of attaching a saw part to a part comprising cooperating blades may be provided.

For example, a saw attachment part may comprise one or more projections that pass through apertures in the blades and are secured thereto by means of one or more nuts. In other embodiments snap fit attachment means may be provided.

In other embodiments other types of dips may be employed.

In yet further embodiments the saw part may attach to the handle parts and extend forward beyond the cooperating blades.

Many variations are possible without departing from the scope of the present invention as defined in the appended claims.

The invention claimed is:

1. A pruning system having a pruning device and a removable saw blade, the pruning system comprising:
the pruning device comprising a pair of cooperating blades that are pivoted together about a pivot bolt, wherein an underside area of each of the pair of cooperating blades below where the pair of cooperating blades are pivoted together form a linear surface when the pair of cooperating blades are in a closed position relative to each other and the pruning device is held in a vertical position with the pair of cooperating blades pointed upwards when the pair of cooperating blades are in the closed position; and
a pair of handle parts, wherein each one of the pair of handle parts is connected to and extends away from a corresponding blade of the pair of cooperating blades, the pair of handle parts movable to and from each other for a user to operate the cooperating blades;
wherein the pruning system further comprising a housing, the removable saw blade secured to the housing and movable in and out of the housing, the housing used to attach and detach the removable saw blade from the pruning device, wherein the pair of cooperating blades are configured to be inserted into the housing when the pair of cooperating blades are in the closed position, the housing preventing the pair of cooperating blades from moving relative to each other when the pair of cooperating blades are inserted therein; and
a toggle latch attached to the housing, the toggle latch configured to engage the linear surface formed by the pair of cooperating blades when the pair of cooperating blades are in the closed position and inserted into the housing to secure the housing and the removable saw blade to the pruning device;
wherein the housing and the toggle latch causing the pair of cooperating blades to be retained in a substantially fixed position relative to each other within the housing allowing the pruning device to function as a saw, and when the pair of cooperating blades are withdrawn from the housing, the removable saw blade is detached from the pruning device, and the pair of cooperating blades are movable to and from each other allowing the pruning device to be used for pruning.

2. The pruning system of claim 1 wherein when the removable saw blade is attached to the pruning device, the pair of cooperating blades are retained in the closed position within the housing.

3. The pruning system of claim 1 wherein the toggle latch is attached to a bottom area of the housing to secure the saw blade to the pruning device when the cooperating blades are received within the housing and the pruning device is held in the vertical position and the pair of cooperating blades pointed upwards when the pair of cooperating blades are in the closed position.

4. The pruning system of claim 1 wherein the removable saw blade is movable in and out of the housing between a first configuration wherein teeth of the removable saw blade are not exposed and a second configuration wherein the teeth of the removable saw blade are exposed.

\* \* \* \* \*